(12) United States Patent
Gaspar et al.

(10) Patent No.: US 9,628,317 B2
(45) Date of Patent: Apr. 18, 2017

(54) GENERALIZED FREQUENCY DIVISION MULTIPLEXING RADIO TRANSMISSION USING FREQUENCY DOMAIN OFFSET-QAM

(71) Applicant: Vodafone GmbH, Dusseldorf (DE)

(72) Inventors: Ivan Gaspar, Dresden (DE); Gerhard Fettweis, Dresden (DE); Maximilian Matthe, Dresden (DE)

(73) Assignee: Vodafone GmbH, Dusseldorf (DE)

( * ) Notice: Subject to any disclaimer, the term of this patent is extended or adjusted under 35 U.S.C. 154(b) by 0 days.

(21) Appl. No.: 14/961,409

(22) Filed: Dec. 7, 2015

(65) Prior Publication Data
US 2016/0164713 A1    Jun. 9, 2016

(30) Foreign Application Priority Data

Dec. 8, 2014 (EP) .................... 14196834

(51) Int. Cl.
| | | |
|---|---|---|
| H04K 1/10 | (2006.01) | |
| H04L 27/28 | (2006.01) | |
| H04L 27/34 | (2006.01) | |
| H04L 27/26 | (2006.01) | |

(52) U.S. Cl.
CPC ........ *H04L 27/3494* (2013.01); *H04L 27/264* (2013.01); *H04L 27/2628* (2013.01); *H04L 27/2698* (2013.01)

(58) Field of Classification Search
CPC ............. H04L 27/3494; H04L 27/2628; H04L 27/264; H04L 27/2698; H04L 27/2684; H04L 27/0014; H04L 25/03159; H04L 5/001
USPC ................ 375/260, 261, 295, 316, 340, 232
See application file for complete search history.

(56) References Cited

U.S. PATENT DOCUMENTS

| | | | |
|---|---|---|---|
| 2010/0296002 A1* | 11/2010 | Cheng ................. | H04L 27/0014 348/725 |
| 2012/0106618 A1* | 5/2012 | Kudo ................ | H04L 25/03159 375/232 |
| 2013/0322575 A1* | 12/2013 | Muquet .................. | H04L 5/001 375/340 |
| 2014/0153675 A1* | 6/2014 | Dandach ............. | H04L 27/2684 375/340 |

OTHER PUBLICATIONS

European Search Report for EP 14 19 6834 dated May 20, 2015.
(Continued)

*Primary Examiner* — Phuong Phu
(74) *Attorney, Agent, or Firm* — Workman Nydegger

(57) ABSTRACT

In a multicarrier radio transmission system complex-valued symbols are assigned to at least a first subcarrier and a second adjacent subcarrier, wherein the symbols assigned to the second subcarrier are offset in frequency by half a subcarrier against the symbols assigned to the first subcarrier.

11 Claims, 2 Drawing Sheets

(56) References Cited

OTHER PUBLICATIONS

Alcatel-Lucent Shanghai Bell et al: "Resource Allocation and Design for D2D Synchronization Signals", 3GPP Draft; 1-143024—Resource Allocation and Design for D2D Synchronization Signals Final, $3^{rd}$ Generation Partnership Project (3GPP), Mobile Competence Centre; 650, Route Des Lucioles; F-06921 SO vol. RAN WG1, no. Dresden, Germany; Aug. 18, 2014-Aug. 22, 2014 Aug. 17, 2014 (Aug. 17, 2014), XP050788503, Retrieved from the Internet: URL:http://www.3gpp.org/ftp/Meetings_3GPP_SYNC/RAN1/Docs/[retrieved on Aug. 17, 2014] * Section 2. D2DSS signal design *.

Michailow Nicola et al: "Generalized Frequency Division Multiplexing for $5^{th}$ Generation Cellular Networks", IEEE Transactions on Communications, IEEE Service Center, Piscataway, NJ. USA, vol. 62, No. 9, Sep. 1, 2014 (Sep. 1, 2014), pp. 3045-3061, XP011559563, ISSN: 0090-6778, DOI: 10.1109/TCOMM.2014.2345566 [retrieved on Sep. 19, 2014] * figures 1,2 * * Section II. System description and properties *.

* cited by examiner

GENERALIZED FREQUENCY DIVISION MULTIPLEXING RADIO TRANSMISSION USING FREQUENCY DOMAIN OFFSET-QAM

CROSS-REFERENCE TO RELATED APPLICATIONS

This application claims the benefit of and priority from European Patent Application No: 14196834.7, filed Dec. 8, 2014, the entire disclosure of which is expressly incorporated by reference herein in its entirety.

BACKGROUND

1. The Field of the Invention

The invention relates to a generalized frequency division multicarrier transmission system and corresponding method to mitigate intercarrier and intersymbol interference. In particular the invention relates to an orthogonal multicarrier transmission system using an Offset—Quadrature Amplitude Modulation (QAM) modulation wherein a frequency shift of half a subcarrier bandwidth is used.

2. The Relevant Technology

Current 4G LTE-(Advanced) systems are based on OFDM that provides intersymbol interference (ISI)-free and intercarrier interference (ICI)-free transmissions in ideal AWGN channels, i.e. in channels where only white Gaussian noise is added to a transmit signal. However, if the channel is time-frequency dispersive such as a real channel of a cellular communication system, good time-frequency localization of the transmit signal is required to cope with asynchronicities. Furthermore, low out-of-band radiation is required to enhance spectral agility and aggregation of carriers.

One way to mitigate interference in transmissions is to use so-called Offset-QAM (OQAM) instead of conventional QAM modulation in a multicarrier system, for example OFDM/OQAM. In Offset-QAM modulation complex valued data symbols $c_{k,m}$ are transmitted on k=1 . . . K subcarriers, where the real and imaginary portion of a symbol are offset by half a symbol duration T, i.e. by ½T. To mitigate inter channel interference each symbol is pulse-shaped with a symmetric, real-valued pulse shaping filter.

The application of conventional Offset-QAM in multicarrier systems requires the use of pulse shaping filters, wherein these have to be symmetric in both the time and the frequency domain and furthermore have to be half-Nyquist filters. Furthermore, in conventional Offset-QAM systems, a phase shift of ½π is required between subcarriers and subsequent symbols, i.e. adjacent sub-carriers are shifted in phase by ½π against each other. Accordingly, this kind of Offset-QAM can be called time-shifted offset-QAM, in short time-shifted OQAM, since the imaginary part of a symbol is shifted in time by half a symbol duration.

In the above described time-shifted Offset-QAM systems complex-valued data symbols $c_{k,m}$ are transmitted on a plurality of k subcarriers, wherein the real and imaginary part are offset by ½T as described above, with T being the symbol duration. Each symbol is pulse-shaped by a prototype filter g(t), which can also be a non-symmetric conjugate-root filter.

Besides for OFDM systems, Offset-QAM has been proposed for GFDM systems. Similar to OFDM, GFDM is a multicarrier transmission system, but wherein circular convolution is applied instead of linear. Hence, a GFDM transmit signal exhibits a block structure, i.e. a plurality of subcarriers each conveying a plurality of symbols, wherein consecutive blocks can be decoupled/separated by appending a cyclic prefix to ease equalization at the receiver side. Hence, GFDM provides good time-frequency localization (TFL).

GFDM can use a conventional QAM modulation to achieve maximal efficiency for some known configurations, but the Balian-Low theorem (BLT) shows that good time-frequency localization can result in distorted reconstruction of complex-valued symbols sent at Nyquist rate.

To mitigate this problem the use of Offset-QAM has been proposed as solution, in particular with an above mentioned non-symmetric conjugate-root pulse-shaping filter. However, the use of time shifting in conventional Offset-QAM reduces the effect of using guard sub-symbols to achieve low out-of-band radiation.

Hence there is a need to provide an improved GFDM system that at least mitigates some of the above mentioned problems.

BRIEF SUMMARY OF THE INVENTION

A multicarrier radio transmitter for transmitting a plurality of complex-valued symbols is described, wherein at least a first subset of the plurality of symbols is assigned to a first subcarrier and a corresponding second subset of the plurality of symbols is assigned to a second, adjacent subcarrier, the transmitter comprising
  at least one modulator (120, 130) containing a prototype transmit filter for pulse shaping the symbols assigned to the first and second subcarrier, and
  wherein said modulator performs a frequency shift only to the symbols assigned to the second subcarrier by a bandwidth of half a subcarrier. Furthermore a corresponding receiver is described.

BRIEF DESCRIPTION OF THE DRAWINGS

The improved multicarrier GFDM transmission system is described in the following with reference to the accompanying figures, wherein.

DETAILED DESCRIPTION

The embodiments as described below relate to a transmitter and corresponding receiver for transmitting and receiving radio signals according to the below described functions. Though the transmitter may be used in any arbitrary radio transmitter and corresponding arbitrary receiver, the functional blocks can be implemented in a transmitter of a cellular communication system. Likewise below described functional blocks of the receiver may be implemented in a receiver of a cellular communication system. Thus a transmitter and a receiver may be implemented in a base station or in a mobile terminal of the cellular communication system.

Note that the figures depict functional blocks as required for the below described transmitter, wherein the transmitter and corresponding receiver may comprise additional blocks known from conventional GFDM systems. In addition to the depicted blocks the transmitter may comprise a mapper for mapping bits to complex-valued symbols, thus producing a stream of complex-valued symbols representing the bits. The transmitter may also comprise a de-multiplexer for de-multiplexing the stream complex-valued symbols to a plurality of streams of complex-valued symbols wherein each stream of symbols is assigned to one of a plurality of carrier frequencies. The symbols of each carrier frequency can be processed individually, i.e. can be filtered or pulse-shaped or modulated individually. Once the symbols of the streams are processed, they are multiplexed to form a block of symbols, wherein said block of symbols comprises symbols of a plurality of carrier frequencies and wherein one or more symbols can be assigned to one carrier frequency.

Note that the functional blocks serve as an illustration only, i.e. the invention shall not be limited to a particular configuration of hard- and or software. Furthermore the functional blocks may be implemented in software only that is executable on a digital signal processor.

Figure 1:
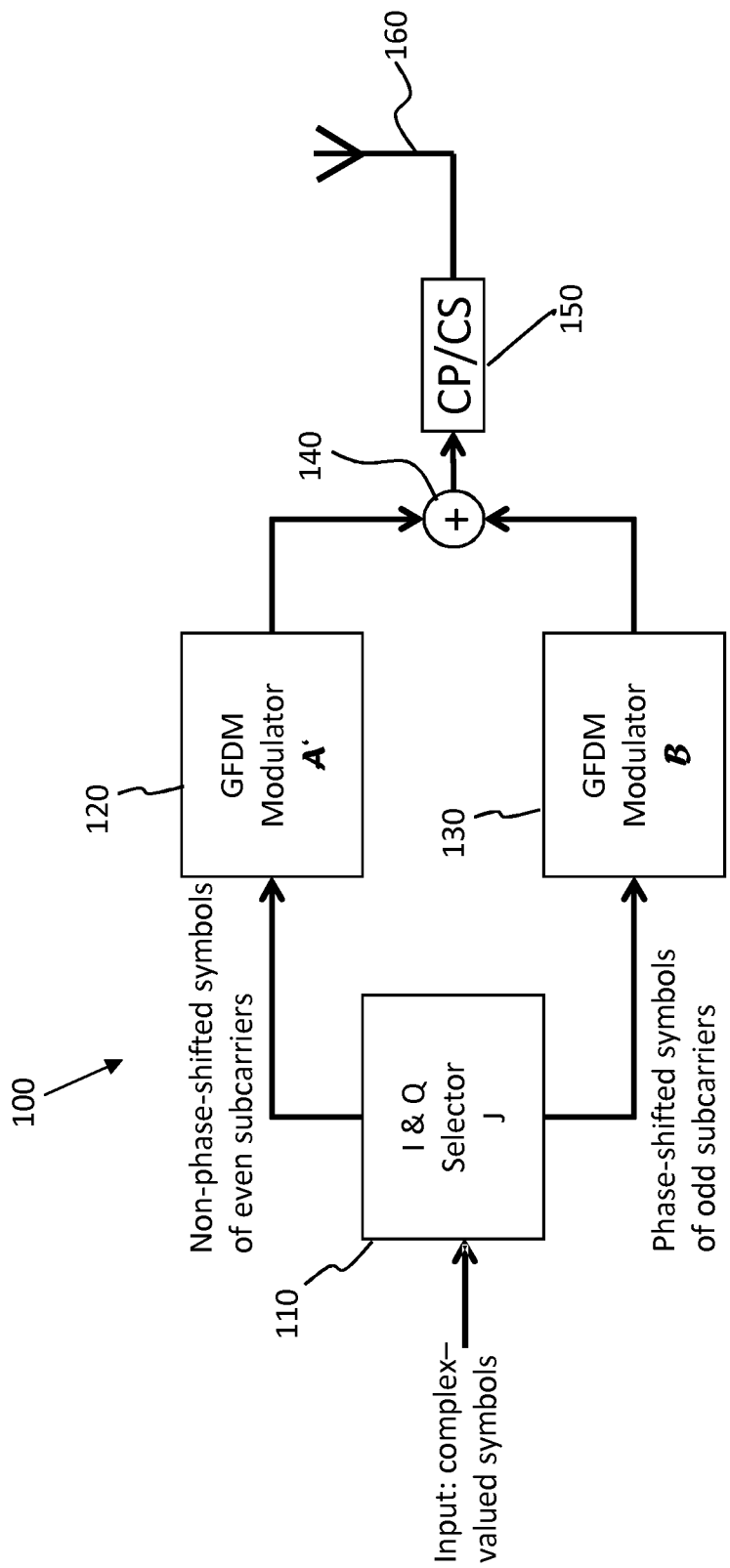
FIG. 1 depicts functional blocks of a GFDM Frequency Offset-QAM transmitter.

FIG. 1 depicts a diagram 100 of functional blocks comprised in a transmitter that provides a frequency-domain Offset-QAM, i.e. the real and imaginary part are shifted against each other in frequency by half a subcarrier bandwidth, which in turn allows the use of guard symbols, i.e. a cyclic prefix and/or a cyclic suffix of complex valued samples, to achieve low out-of-band emission The I&Q input selector 110 takes a vector of complex-valued symbols, e.g. of a QAM signal point constellation, as input, wherein the symbols are assigned to a respective plurality of subcarriers. In one embodiment symbols that are assigned to an odd numbered subcarrier are phase shifted by ½π whereas symbols assigned to an even numbered carrier remain without phase shift, i.e. symbols assigned to an odd numbered subcarrier are moved to imaginary. This operation can be performed by multiplying the vector of symbols with matrix J, wherein $$J = I_M \otimes \mathrm{diag}(j^{-\Theta_k})$$

wherein diag(•) contains the argument vector on its diagonal and zeros elsewhere, ⊗ denotes the Kronecker product and $I_M$ denotes an identity matrix of size M, with M being the number of symbols in the block.

Note that in an equivalent embodiment symbols assigned to an even numbered subcarrier may be phase shifted by ½π whereas symbols assigned to an odd numbered carrier remain without phase shift, i.e. symbols with an even numbered subcarrier are moved to imaginary.

I&Q selector 110 outputs a vector of symbols assigned to odd numbered subcarriers that are phase shifted by ½π and at the same time outputs another vector of symbols without phase-shift and assigned to a corresponding plurality of even numbered subcarriers. In an alternative embodiment the vector of phase-shifted symbols may be assigned to even subcarriers while the vector of non-phase-shifted symbols may be assigned to odd subcarriers.

The vector consisting of symbols without phase shift is passed to a first GFDM modulator block 120 while the vector consisting of phase-shifted symbols, i.e. the vector of delayed symbols, is passed a second GFDM modulator block 130.

The first modulator 120 applies a modulation matrix A'

$$A' = W_N^H A$$

which performs a pulse shaping operation by applying a prototype transmit filter g[n] implemented as a pulse shaping filter matrix A and at the same time performs a frequency shift by half a subcarrier by applying an N×N discrete Fourier transform (DFT) matrix $$W_N = 1/\sqrt{N} \exp\left(-j 2\pi \frac{i^T i}{N}\right)$$

with i=(0, . . . , N−1) and N=MK.

The columns of the filter pulse shaping matrix A may contain a critically sampled circular time-frequency shifted version of a prototype transmit filter g[n] with normalized distance T=K and F=1/K in frequency, where K is the number of subcarriers, given by $$g_{k,m}[n] = g[(n-mK) \bmod N] \cdot w^{kn}$$

wherein k is the index of a subcarrier, m denotes the m-th symbol of a block of symbols and n denotes the sampling index in 0 . . . n . . . N. Accordingly each $g_{k,m}[n]$ is a time and frequency shifted version of the prototype filter $g_{k,m}[n]$, wherein the modulo operation makes $g_{k,m}[n]$ a circularly shifted version of $g_{k,0}[n]$.

By applying modulation matrix A' to the vector of the input symbols, they are pulse shaped according to the pulse shaping function. Accordingly modulator 120 outputs a vector of pulse-shaped symbols to adder 140.

The second modulator 130 takes the vector of symbols as input. Similar as modulator 120, modulator 130 performs a pulse-shaping operation by applying the same prototype transmit filter A and also by applying the same DFT matrix $W_N$ and in addition applies a shift in frequency by half a subcarrier $$B = W_N^H C_{K/2} \qquad (A)$$

wherein $C_{K/2}$ can be a circulant matrix having a structure of:

$$C_1 = \begin{bmatrix} 0 & 0 & \ldots & 0 & 1 \\ 1 & 0 & \ldots & 0 & 0 \\ 0 & 1 & \ddots & \vdots & \vdots \\ \vdots & \ddots & \ddots & 0 & 0 \\ 0 & \ldots & 0 & 1 & 0 \end{bmatrix}$$

This and equivalent circulant matrices are known from e.g. Philip J. Davis, Circulant Matrices, American mathematical Soc. published in 1979, or Robert M. Gray, Toeplitz and circulant matrices: A review, published by now publishers inc. in 2006

As a consequence the vector of symbols as output by modulator 140 is shifted in frequency by half a subcarrier, i.e. by a bandwidth of half a subcarrier.

The symbol vectors as output from the first modulator 120 and the second modulator 130 are then combined in adder 140 thus forming a vector of symbols of all subcarriers, wherein symbols of adjacent subcarriers are shifted in frequency by half a subcarrier against each other, i.e. the symbols are offset in frequency against each other by a bandwidth of half a subcarrier bandwidth. Note that adder 140 may combine a plurality of vectors from the first modulator 120 and a corresponding plurality of vectors from second modulator 130 to form a block of symbols.

Note that in an alternative embodiment the modulation of the at least two subcarriers as performed in modulators 120 and 130 can be implemented by a single matrix operation that can be performed in one digital signal processor, i.e. the modulation functions of both modulators 120 and 130 can be performed by one modulator implemented as a matrix operation performed by a digital signal processor.

Then a cyclic prefix and/or a cyclic suffix can be added in prefix/suffix block 150 to a block of symbols as output by adder 140. The output of prefix/suffix block 150, i.e. the symbols including a cyclic prefix and/or a cyclic suffix then is further processed and radiated. Said block 150 can be implemented as a matrix operation that adds samples of a prefix/suffix based on the payload symbols of the block. Further note that the block of symbols including a prefix/suffix may be subject to further processing before being radiated, i.e. the block of time digital samples representing the symbols at least must be converted from the digital domain to the analog domain and must be amplified by a power amplifier to provide the necessary energy to the analog transmit signal.

Due to the frequency shift by half a subcarrier bandwidth between adjacent subcarriers and due to the shift in time of symbols of adjacent subcarriers, the radiated signal exhibits the properties as depicted in FIG. 3.

Figure 2:
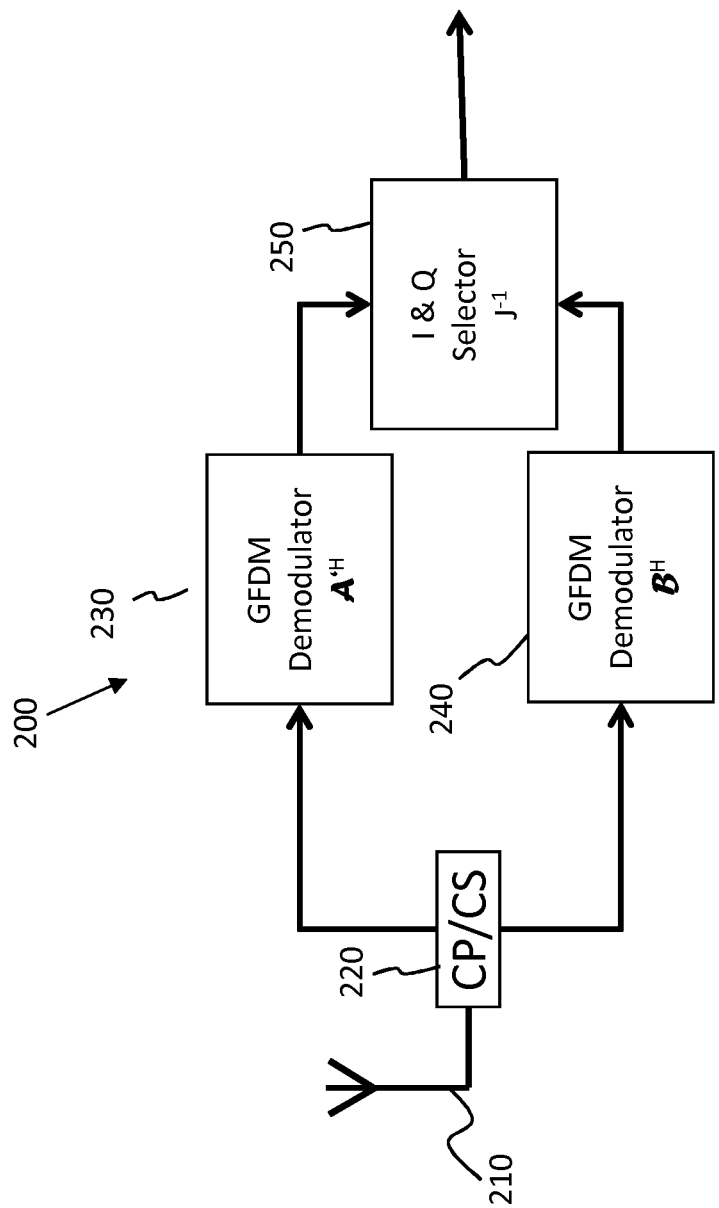
FIG. 2 depicts functional blocks of a GFDM Frequency-Offset QAM receiver.

FIG. 2 depicts a diagram 200 processing blocks comprised in a receiver adapted for receiving and processing a radio signal radiated by above described transmitter.

A radiated signal is received by antenna 210. Subsequently the received analog signal may be processed by analog processing blocks, e.g. a low-noise amplifier, and is converted by an analog-to-digital converter into the digital domain for further processing. Note that these analog processing blocks as well as the analog-to-digital converter are not depicted in the figure.

The digitized signal is then forward to prefix/suffix remover 220 to remove the samples of an appended/prepended cyclic prefix or suffix. Prefix/suffix remover 220 accordingly outputs digital samples representing the received signal without prefix/suffix, i.e. prefix/suffix remover 220 outputs a stripped signal.

The stripped signal as output by prefix/suffix remover 220 is provided to a first demodulator 230 that applies the Hermitian of modulation matrix A' used in the first modulator 120 of the transmitter to the stripped signal. The first demodulator 230 thus outputs complex-valued symbols, i.e. a stream of samples representing the complex-valued symbols.

At the same time the stripped signal as output by prefix/suffix remover 220 is provided to a second demodulator 240 that applies the Hermitian of modulation matrix B used in the second modulator 130 of the transmitter to the stripped signal. Second demodulator 240 outputs complex-valued symbols, i.e. a stream of samples representing the complex-valued symbols.

The output of the first demodulator 230 and the output of the second demodulator 240 are forwarded as input to I&Q (de-)selector 250. Selector 250 outputs either the real part or the imaginary part of an incoming symbol, based on whether the symbol is assigned to an even-numbered or odd-numbered subcarrier, whose assigned symbols have been modulated by one or respectively the other of the two modulators comprised in the transmitter.

Accordingly, if a symbol has been assigned to an even-numbered subcarrier in the transmitter, selector 250 will output only the real part of the demodulated symbol, because the real part does not suffer from interference introduced into the signal by adjacent subcarriers. In case a symbol has been assigned to an odd-numbered subcarrier in the transmitter, selector 250 outputs only the imaginary part of the symbol, because that does not suffer from interference introduced by adjacent subcarriers. Selector 250 may accordingly output a stream of real parts and imaginary parts of transmitted symbols.

Note that the symbols as output by selector 250 may be subject to further digital processing that is not shown in the drawing, i.e. the symbols may be processed by a demapper block that de-maps the symbols to bits, said bits in turn may be subject to further processing.

What is claimed is:

1. A multicarrier radio transmitter for transmitting a plurality of complex-valued symbols, wherein at least a first subset of the plurality of symbols is assigned to a first subcarrier and a corresponding second subset of the plurality of symbols is assigned to a second, adjacent subcarrier, the transmitter comprising:
   one or more processors,
   one or more computer-readable non-transitory storage media having stored thereon computer-executable instructions that are executable by the one or more processors to instantiate in the storage media:
   at least one modulator containing a prototype transmit filter for pulse shaping the symbols assigned to the first and second subcarrier,
   wherein said modulator performs a frequency shift only to the symbols assigned to the second subcarrier by a bandwidth of half a subcarrier.

2. The multicarrier radio transmitter of claim 1, wherein the processors further instantiate in the storage media a prefix/suffix block for adding a cyclic prefix or a cyclic suffix to one block of modulated symbols, said block comprising a plurality of symbols assigned to the first subcarrier and a plurality of symbols assigned to the second, adjacent subcarrier.

3. The multicarrier radio transmitter of claim 1, wherein the at least one modulator applies a modulation matrix A'

$$A' = W_N^H A$$

to the symbols assigned to the first subcarrier and a modulation matrix $$B = W_N^H C_{K/2}(A)$$

to the symbols assigned to the second, adjacent subcarrier, wherein the columns of filter matrix A contain a critically sampled circular time-frequency shifted version of a prototype pulse shaping filter, $W_N^H$ performs a discrete Fourier transform, and $C_{K/2}$ performs a frequency shift of a bandwidth of half a subcarrier bandwidth.

4. The multicarrier radio transmitter of claim 1, wherein the prototype pulse shaping filter is a root raised cosine filter.

5. A multicarrier radio receiver for receiving a multicarrier signal representing complex-valued symbols assigned to at least a first and a second, adjacent subcarrier, wherein symbols assigned to the second subcarrier are shifted in frequency by half a carrier bandwidth against symbols assigned to the first subcarrier, the receiver comprising:
   one or more processors,
   one or more computer-readable non-transitory storage media having stored thereon computer-executable instructions that are executable by the one or more processors to instantiate in the storage media:
   a first demodulator applying a Hermitian of a modulator matrix applied to symbols of the first subcarrier;
   a second demodulator applying a Hermitian of the modulator matrix applied to the symbols of the second, adjacent subcarrier; and
   a selector receiving the demodulated symbols from the first and the second demodulator respectively and outputting only the real part of symbol or only the imaginary part of a symbol.

6. The multicarrier radio receiver of claim 5, wherein the processors further instantiate in the storage media a prefix/suffix remover for removing a cyclic prefix or a cyclic suffix from a block of modulated symbols, said block comprising a plurality of symbols assigned to the first subcarrier and a plurality of symbols assigned to the second, adjacent subcarrier.

7. A multicarrier radio transmission method, implemented at computing system that includes one or more processors and one or more computer-readable non-transitory storage media having stored thereon computer-executable instructions that are executable by the one or more processors to instantiate in the storage media at least a prototype transmit filter, the method for transmitting a plurality of complex-valued Quadrature Amplitude Modulation (QAM) symbols, where at least a first subset of the plurality of symbols is assigned to a first subcarrier and a corresponding second subset of the plurality of symbols is assigned to a second, adjacent subcarrier, the method comprising:

modulating the symbols assigned to the first and second subcarrier by the prototype transmit filter for pulse-shaping; and shifting in frequency by a bandwidth of half a subcarrier only the symbols assigned to the second subcarrier.

8. The multicarrier radio transmission method of claim 7, comprising the step of adding a cyclic prefix or a cyclic suffix to one block of symbols, said block comprising a plurality of symbols assigned to the first subcarrier and a plurality of symbols assigned to the second, adjacent subcarrier.

9. The multicarrier radio transmission method of claim 7, wherein the modulation applies a modulation matrix A'

$$A' = W_N^H A$$

to the symbols assigned to the first subcarrier and a modulation matrix $$B = W_N^H C_{K/2}(A)$$

to the symbols assigned to the second, adjacent subcarrier, wherein the columns of filter matrix A contain a critically sampled circular time-frequency shifted version of a prototype pulse shaping filter, $W_N^H$ performs a discrete Fourier transform, and $C_{K/2}$ performs a frequency shift of a bandwidth of half a subcarrier bandwidth.

10. A multicarrier radio receive method, implemented at computing system that includes one or more processors and one or more computer readable non-transitory storage media having stored thereon computer-executable instructions that are executable by the one or more processors to instantiate in the storage media at least a first demodulator, a second demodulator, and a selector, the method for receiving a multicarrier signal representing complex-valued symbols assigned to at least a first and a second, adjacent subcarrier, wherein symbols assigned to the second subcarrier are shifted in frequency by half a carrier bandwidth against symbols assigned to the first subcarrier, the method comprising:

the first demodulator applying a Hermitian of a modulator matrix applied to symbols of the first subcarrier;

the second demodulator applying a Hermitian of the modulator matrix applied to the symbols of the second, adjacent subcarrier; and the selector receiving the demodulated symbols from the first and the second demodulator respectively and outputting only a real part of symbol or only an imaginary part of a symbol.

11. The multicarrier radio receive method of claim 10, comprising a removing a cyclic prefix or a cyclic suffix from a block of modulated symbols, said block comprising a plurality of symbols assigned to the first subcarrier and a plurality of symbols assigned to the second, adjacent subcarrier.

* * * * *